Patented Sept. 12, 1950

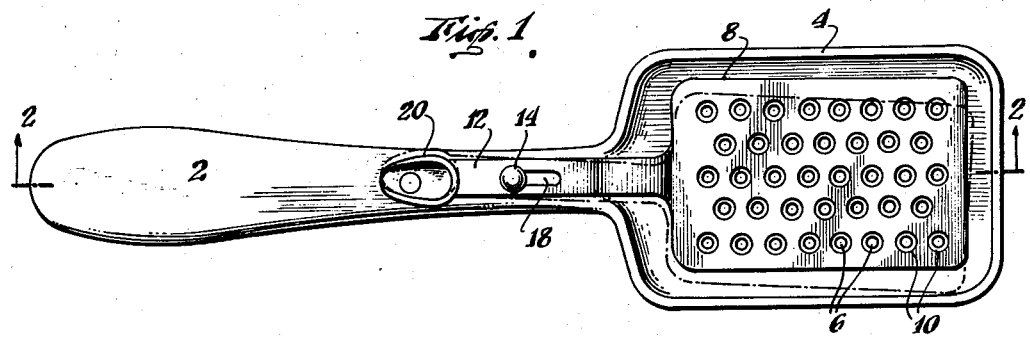
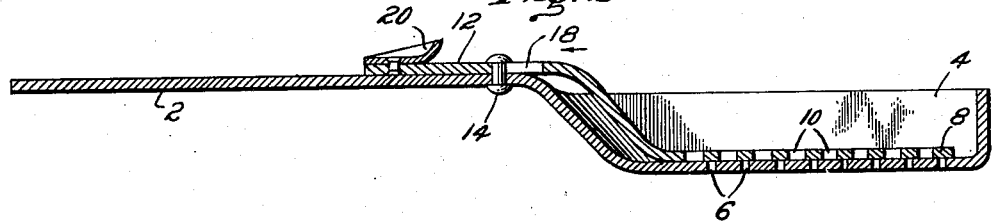

2,522,343

UNITED STATES PATENT OFFICE 2,522,343

KITCHEN UTENSIL

Gertrude R. Canfield, Oklahoma City, Okla.

Application April 4, 1946, Serial No. 659,529

1 Claim. (Cl. 209—398)

This invention relates to a sifting kitchen utensil.

The invention is particularly useful in connection with spoons and will be first illustrated by description in connection with such use.

There has long been need of a spoon which may be dipped into a supply of flour, for instance, carried to the stove, and then used to sift the flour, but insofar as I know there has not been made up to this time any spoon that is satisfactory both in preventing occasional loss of flour on the way to the stove and in sifting the flour upon the food being prepared.

I have now invented a simple utensil which prevents the premature passing of flour or like material therethrough and yet acts as a sieve when a sifting action is desired.

Briefly stated, the invention comprises a kitchen utensil having a handle, a bowl provided in the bottom thereof with spaced holes of size suitable for sifting finely divided materials, a plate disposed adjacent to the bottom of the bowl and provided with spaced apertures that are normally out of register with the holes in the bowl, and means for causing shifting of the plate with respect to the bowl so as to place the said holes and apertures in communication at the time the sifting is performed.

In the preferred embodiment, the invention comprises pivotal mounting of an extension of the plate upon the handle of the spoon so that the plate may be vibrated by movement of the extension, as from side to side or longitudinally.

The invention will be further illustrated by description in connection with the attached drawing to which reference is made.

Fig. 1 is a plan view of the preferred embodiment of the invention.

Fig. 2 is a sectional view on line 2—2 of Fig. 1.

Parts not shown in detail in the figures are conventional.

There are shown a spoon with handle 2 and bowl 4 provided in the bottom thereof with spaced holes 6 of suitable size for sifting flour, starch, granulated sugar, salt, or other subdivided food ingredient.

Disposed adjacent to the bottom of the spoon and of shape conforming generally to the adjacent part of the bottom is plate 8 provided with apertures 10 of about the same size as the holes in the bottom of the bowl of the spoon. This plate in the preferred embodiment has an extension 12 which may be regarded as a handle to the plate.

This extension 12 is mounted pivotally, that is, in axially movable or vibratory manner, at an intermediate position upon the handle 2 by means of the rivet 14 extending loosely through a hole in the handle and through an opening 18 in the extension, this opening 18 being suitably in the form of a slot causing the extension and the attached plate to be shiftable longitudinally with respect to pin 14 and therefore with respect to the bowl of the spoon.

At the end of the extension there is suitably mounted in a conventional manner a thumb receiver 20 adapting the end of the extension to be vibrated, that is moved, from side to side at moderate speed, by the thumb of the hand which holds the handle 2.

The spacing and arrangement of the apertures 6 and 10 in the bottom of the spoon and in the plate is such that all of the holes 10 may be placed out of register with the holes 6 at the same time. When this is done then material contained in the spoon above the plate 8, does not pass through the bottom of the spoon. It is convenient to have the holes in 6 and 10 of the same size spaced regularly and equally from each other in the plate and bowl of the spoon, and at distances apart greater than the diameter of the holes, so that when one hole is shifted out of register the other holes necessarily are also out of register. When this spacing is regular both longitudinally and transversely of the apertured members, then the holes may be placed out of register by shifting the plate 8 either (a) transversely by lateral movement of the end of the extension 12 or (b) longitudinally by movement of plate 8 so as to change the position of mounting means 14 within the slot 18. When the holes are out of register because of the position of pin 14 within slot 18, then there is avoided accidental sifting due to lateral movement of extension 12.

With the holes in the plate and the bottom of the spoon in non-registering relationship as shown in Fig. 2, the spoon is filled in part at least with the material to be sifted. The spoon is then held over the food to receive the sifted material. The handle of the spoon is held in the palm of the hand of the operator, the thumb hold 20 and attached plate are pushed in direction away from the operator so as either to place the holes 6, 10 in actual registration or at least to place holes 6 in line with holes 10 transversely of the spoon, the thumb is placed in the thumb receiver 20, and this receiver and attached extension of the plate are then moved by the thumb from side to side in a vibrating movement. This causes the holes 10 of the plate to communicate momentarily and at frequent intervals with the holes 6 in the spoon proper. Sifting results. When the sifting is completed, extension 12 is shifted with respect to pin 14, so as to make the holes 6 and 10 non-registering with each other and out of line transversely of the spoon.

A spoon of the kind described prevents loss of material on the way to the stove, for instance, and ensures a good sifting action when desired.

The spoon may be constructed of materials that are usual in the manufacture of conventional spoons, as, for instance, aluminum or other metal, glass, plastic, or the like, the pin 14 in any case being preferably constructed of metal.

It is to be understood that the spoon has been used to illustrate the general class of kitchen utensils which may be constructed in the manner described.

It will be understood also that it is intended to cover all changes and modifications of the example of the invention herein chosen for the purpose of illustration which do not constitute departures from the spirit and scope of the invention.

What I claim is:

A sifting spoon comprising a bowl provided with holes in the bottom thereof, a handle for the bowl, a plate that is undersize with respect to the bowl, is disposed adjacent to and above the said bottom, and is provided with apertures, an extension in the form of a handle for the said plate provided with a longitudinal slot, a fastening element extending through the said slot and mounting the said extension pivotally upon the handle for said bowl, so that the said extension is movable laterally to and fro and also lengthwise of the handle, the said holes and apertures being of size for sifting flour and like material and being so located as to be placed alternately in registration and non-registration by the lateral and lengthwise movement of the said extension.

GERTRUDE R. CANFIELD.

REFERENCES CITED

The following references are of record in the file of this patent:

UNITED STATES PATENTS

| Number | Name | Date |
| --- | --- | --- |
| 337,550 | Beneke | Mar. 9, 1886 |
| 812,312 | Ward | Feb. 13, 1906 |
| 837,506 | Raney | Dec. 4, 1906 |
| 1,334,169 | Royer | Mar. 16, 1920 |
| 1,601,613 | Fenyves | Sept. 28, 1926 |

FOREIGN PATENTS

| Number | Country | Date |
| --- | --- | --- |
| 5,929 | Great Britain | June 22, 1905 |
| 544,998 | Great Britain | May 6, 1942 |